(12) United States Patent
Whitcomb

(10) Patent No.: US 6,260,813 B1
(45) Date of Patent: Jul. 17, 2001

(54) AIRCRAFT SEAT TRACK ANCHOR FITTING

(75) Inventor: Newell E Whitcomb, Newark, DE (US)

(73) Assignee: November Whiskey, Inc., Newport, DE (US)

( * ) Notice: Subject to any disclaimer, the term of this patent is extended or adjusted under 35 U.S.C. 154(b) by 0 days.

(21) Appl. No.: 09/480,611

(22) Filed: Jan. 10, 2000

(51) Int. Cl.[7] .................. B64D 11/06; B64D 13/00; B64D 25/02; B64D 25/102; B64D 1/106; B64C 1/00; A47B 97/00; F16B 37/00; F16B 39/00; F16B 39/02

(52) U.S. Cl. ...................... 248/503.1; 244/118.6; 244/131; 244/129.1; 244/122 R; 410/104; 410/105; 410/101

(58) Field of Search ............... 244/118.1, 118.6, 244/131, 129.1, 122 R, 122 AH; 248/503.1; 410/104, 105, 116, 115, 101

(56) References Cited

U.S. PATENT DOCUMENTS

| | | | |
|---|---|---|---|
| 4,376,522 | * 3/1983 | Banks .......................... | 248/503.1 |
| 4,496,271 | * 1/1985 | Spinosa et al. .............. | 410/105 |
| 4,630,982 | * 12/1986 | Fenner ........................ | 410/105 |
| 4,708,549 | * 11/1987 | Jensen ........................ | 410/105 |
| 4,796,837 | * 1/1989 | Dowd .......................... | 248/503.1 |
| 4,932,816 | * 6/1990 | Ligensa ...................... | 244/118.6 |
| 5,058,829 | * 10/1991 | Bentley ...................... | 244/118.6 |
| 5,083,726 | 1/1992 | Schurr . | |
| 5,337,979 | * 8/1994 | Bales et al. ................. | 244/118.1 |
| 5,520,357 | 5/1996 | Payne . | |

* cited by examiner

Primary Examiner—Charles T. Jordan
Assistant Examiner—Christian M. Best
(74) Attorney, Agent, or Firm—E. Alan Uebler, P.A.

(57) ABSTRACT

A fitting for anchoring an aircraft seat to a track mounted to the floor of the aircraft is provided. The fitting is removably mounted to the seat and includes a generally rectangular elongate base having flange-like extensions running longitudinally thereof. The base has symmetric slide bearings affixed thereto, one at each end thereof, and overlaying the base, dimensioned so that the base with attached bearings is slidably insertable into the slot of the track. When the seat is mounted to the track, the symmetric bearings are in contact with the upper inside surfaces of the slot within the track, providing relative ease of slidable movement thereof when required.

7 Claims, 3 Drawing Sheets

AIRCRAFT SEAT TRACK ANCHOR FITTING

BACKGROUND OF THE INVENTION

Fittings for attaching seats securely to aircraft are many and varied. Optimal use of available space coupled with secure and safe connections while maintaining ease of assembly and disassembly are the goals sought in the design of aircraft seat anchors.

Many types of fittings have been designed to removably secure an aircraft seat within tracks upon which the seat is carried, which tracks are mounted such as by bolting them to the floor of the aircraft. These fittings are secured to the seat legs and the fittings are received in the tracks and secured at select locations of the tracks to provide adjustable spacing for legroom for a particular seat, for example the pilot, or to provide adjustment of the spacing between rows of seats.

U.S. Pat. No. 5,083,726, and the references cited therein, disclose various fittings used to removably secure an airplane seat within a track mounted to the floor of the airplane. In such devices, factors which must be considered include the very high loads which must be sustained, on the one hand, as well as the elimination of noise or rattle caused by the plane's vibration.

The '726 patent discloses one type of known fitting wherein the bearing section of the fitting comprises an opening defined by two truncated conical walls with the abutting truncated sections providing a bearing site. The open ends of the opening are surrounded by segmented spherical bearing surfaces which carry caps having conforming internal, spherical bearing surfaces. A pin passes through the assembly of caps and bearing section to secure the leg in position. A plastic, box-like anti-rattle device to prevent rattling is mounted to the rear of the track fitting and bears against the top of a track receiving the fitting.

Still further, U.S. Pat. No. 5,520,357 discloses a fitting for attaching a galley wall or bulkhead to the interior of the aircraft. The fitting employs a separable attachment plate and a bolt. The bolt serves to link the galley to the floor through the attachment plate, a track affixed to the floor, and a threaded anchor nut located within the track. The bolt is inserted through the attachment plate into the anchor nut from above after the bulkhead has been set in place on the track and attachment plate, avoiding the need to raise the bulkhead when connecting it to the fitting.

Prior fittings have achieved success to varying degrees in meeting the stated goals of an optimal seat anchor. The aircraft seat track anchor fitting according to the present invention provides defined improvements over prior fittings and is especially suited for a particular aircraft, although its principles are adaptable to many other types of aircraft.

SUMMARY OF THE INVENTION

A composite fitting for anchoring an aircraft seat to and within a track mounted to the floor of the aircraft is provided. The fitting has an elongate base, generally rectangular in both longitudinal and transverse dimensions, and having symmetric, flange-like extensions extending outwardly from the base, transversely, on both sides thereof and at either end thereof and running longitudinally along the base. The base has symmetric bearings, one each affixed to the base at either end thereof, each bearing extending transversely over the base and base extensions and is sized so as to enable the base and base extensions with affixed bearings to be slidably insertable into the slot of the track. The fitting has mounting means for removably affixing the fitting to the aircraft seat such that, when the seat is mounted and affixed to the track, the surfaces of the symmetric bearings contact the upper inside surfaces of the slot within the track, providing relative ease of slidable movement thereof, when seat movement or removal is required or desired. The means for affixing the fitting to the seat includes an internally threaded opening in the elongate base and a threaded cylindrical stud threadably attached to the base in the threaded opening and extending through a through-hole in the frame of the seat and being affixed thereat by an anchoring nut.

The base of the fitting is preferably constructed of steel and the bearing is constructed of a plastic, including ultra high molecular weight polyethylene, nylon, polytetrafluoroethylene and acetal. The preferred bearing material is ultra high molecular weight polyethylene.

The fitting of the invention is especially adapted for use as seat anchors for the Aerostar PA 60 aircraft, although the principles according to the invention will apply to other aircraft, as will be evident to those skilled in the art.

DETAILED DESCRIPTION OF THE INVENTION AND PREFERRED EMBODIMENTS WITH REFERENCE TO THE DRAWINGS

Figure 1:
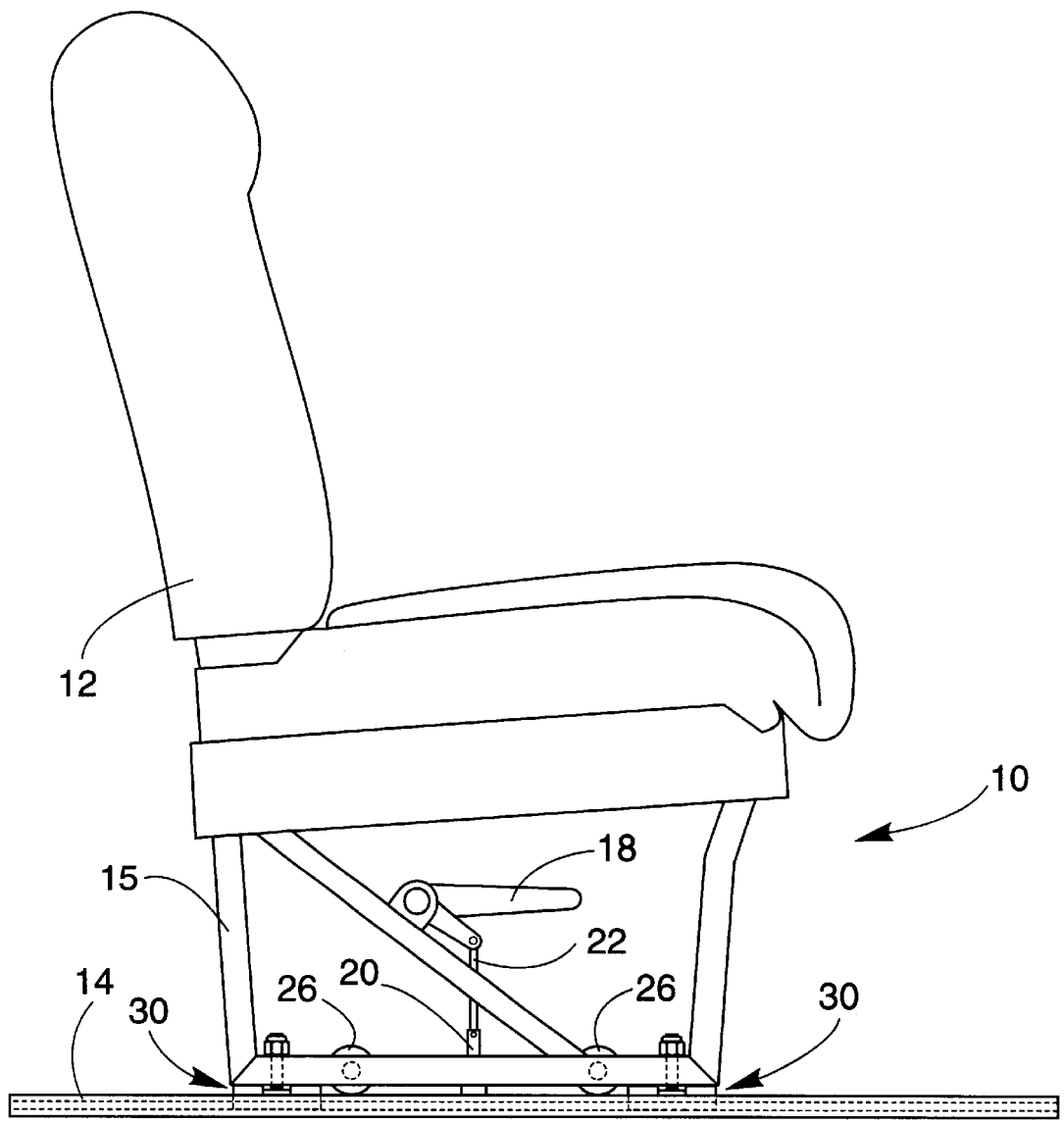
FIG. 1 is a side elevation of the seat track anchor fitting of the invention, in place, securing an aircraft seat to tracks which, in turn, are mounted on and secured to the floor of the airplane.

A detailed description of the invention is best provided by reference to the accompanying drawings wherein FIG. 1 shows a side elevation of an aircraft seat assembly 10 shown secured in place by the track anchor fitting 30 according to the invention. Therein, seat 12 having seat frame 15, to which are attached wheels 26, rests upon track 14, and is secured thereat by fittings 30. The position of the seat 12 is fixed and locked by means of the pin 20, which is spring-loaded (not shown) and is activated and deactivated by means of lever mechanism 18 and connecting rod 22. When the lever 18 and pin 20 are disengaged, as discussed below, the seat 12 is movable along the track 14 fore and aft, and rides on the wheels 26.

Figure 2:
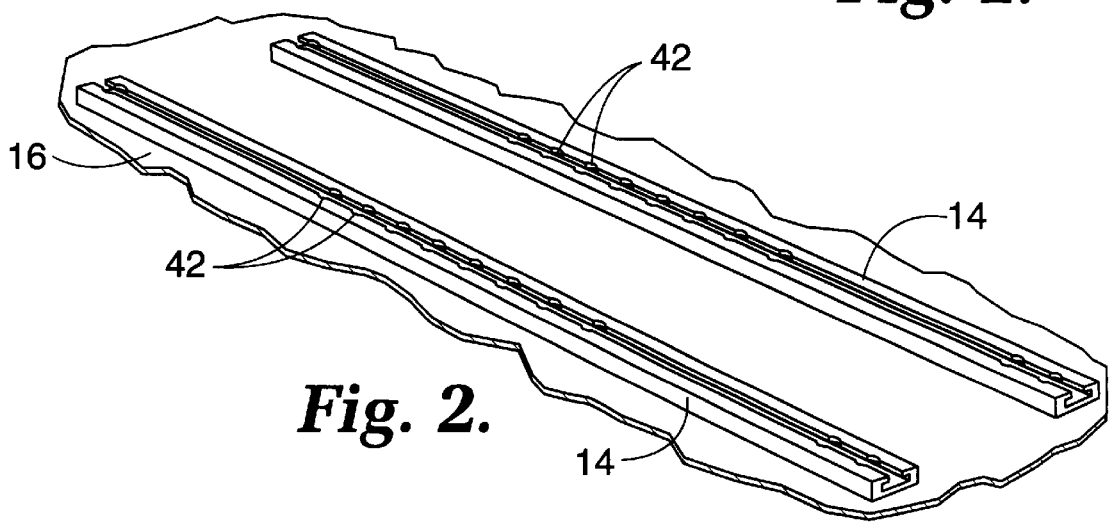
FIG. 2 is a perspective view of tracks affixed to the floor of the airplane to which seats are to be secured.

In FIG. 2, the tracks 14 are shown mounted to the floor 16 of the aircraft. Circular openings 42, spaced at desired intervals, typically one inch, are located along the length of tracks 14 for receiving the locking pin 20 at a desired location.

Figure 3:
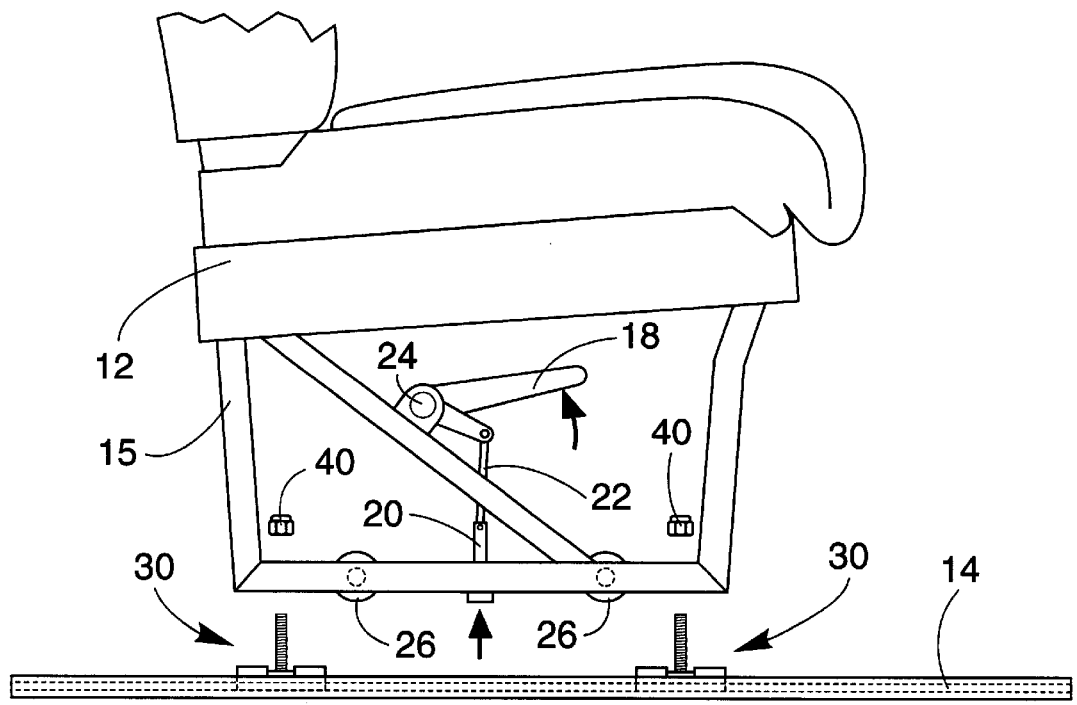
FIG. 3 depicts an aircraft seat in the process of being removed from (or installed on) its mounting tracks.

When it is desired to remove a chair 12, as shown in FIG. 3, the anchor nuts 40 (4 in all) are removed as shown, and the chair is lifted from the track 14. If it is desired to move the chair 12 along tracks 14, but not remove it, the anchor nuts 40 are left in place and the lever handle 18 is pulled upwardly in the direction of the arrow shown. This releases the locking pin 20 and enables the chair to be moved fore or aft, as desired, by rolling along track 14 upon the wheels 26, during which movement the fittings 30 slide easily through the slots in tracks 14.

Figure 4:
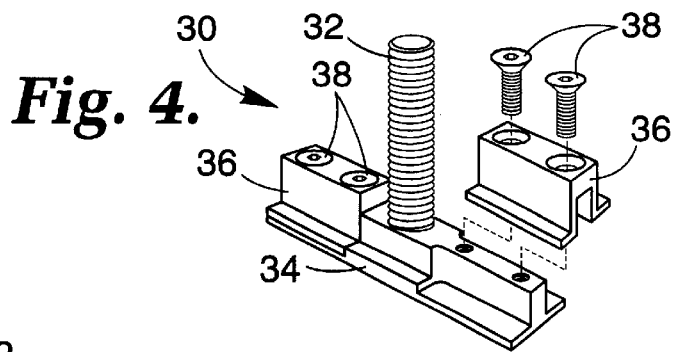
FIG. 4 is an exploded perspective view of the fitting according to the invention.
Figure 5:
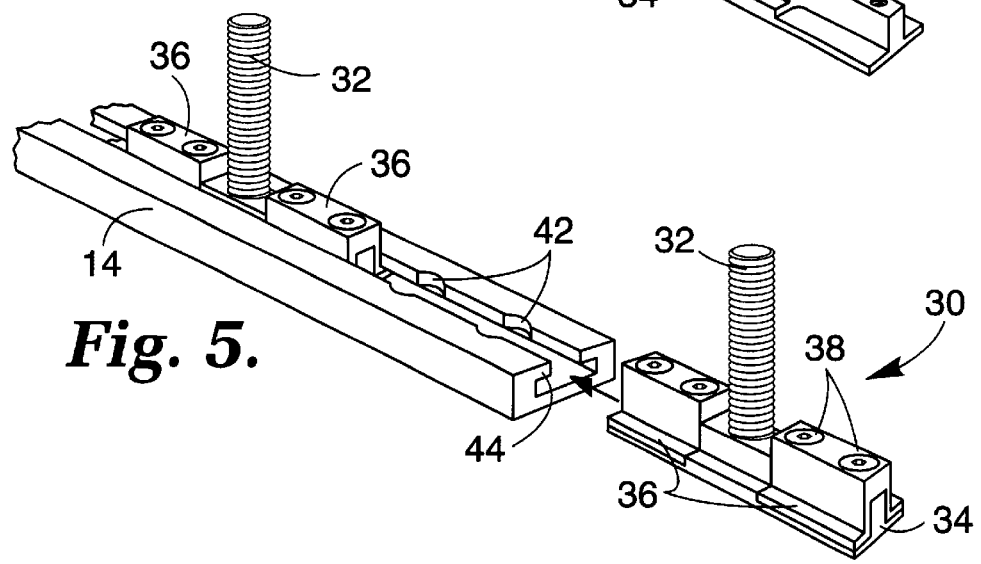
FIG. 5 is a perspective view of fittings of the invention, one inserted into and one about-to-be inserted into the slot of an aircraft seat securing track.

More detailed views of the fittings 30 are depicted in the perspective views shown in FIGS. 4 and 5. Therein, fitting 30 is shown to include the elongate base 34, which is preferably steel, and which has affixed thereto, at either end, the symmetric bearings or bushings 36, which extend transversely over the base 34, as shown, and over the flange extensions thereof which run longitudinally along base 34. These bearings 36 are affixed to the base by means of, for example, threaded screws 38 extending into the threaded openings in base 34 as shown. The bearings 36 are preferably of an abrasion resistant plastic such as ultra high molecular weight polyethylene, nylon, polytetrafluoroethylene and acetal. Most preferred is ultra high molecular weight polyethylene, which enables ease of slidability of the fittings within the slots of tracks 14.

To complete the fitting 30, as shown in FIGS. 4 and 5, a threaded stud 32 is removably inserted into a threaded opening in base 34 as shown, and extends upwardly from the base 34 and is insertable through through-holes (not shown) in the frames 15 of chair 12, depicted in FIG. 3. In FIG. 5, one fitting 30 has been inserted into track 14 as shown, and a second fitting 30 is about to be received into the slot of track 14 as indicated by the arrow. The bearing 36 and base 34 are sized so as to fit within the slot of track 14 as shown, and the bearing surface of bearing 36 contacts and slides along the inner surfaces of lips 44 of track 14 during movement of the chair assembly 10, and thereby makes such movement relatively easy to effect.

Figure 6:
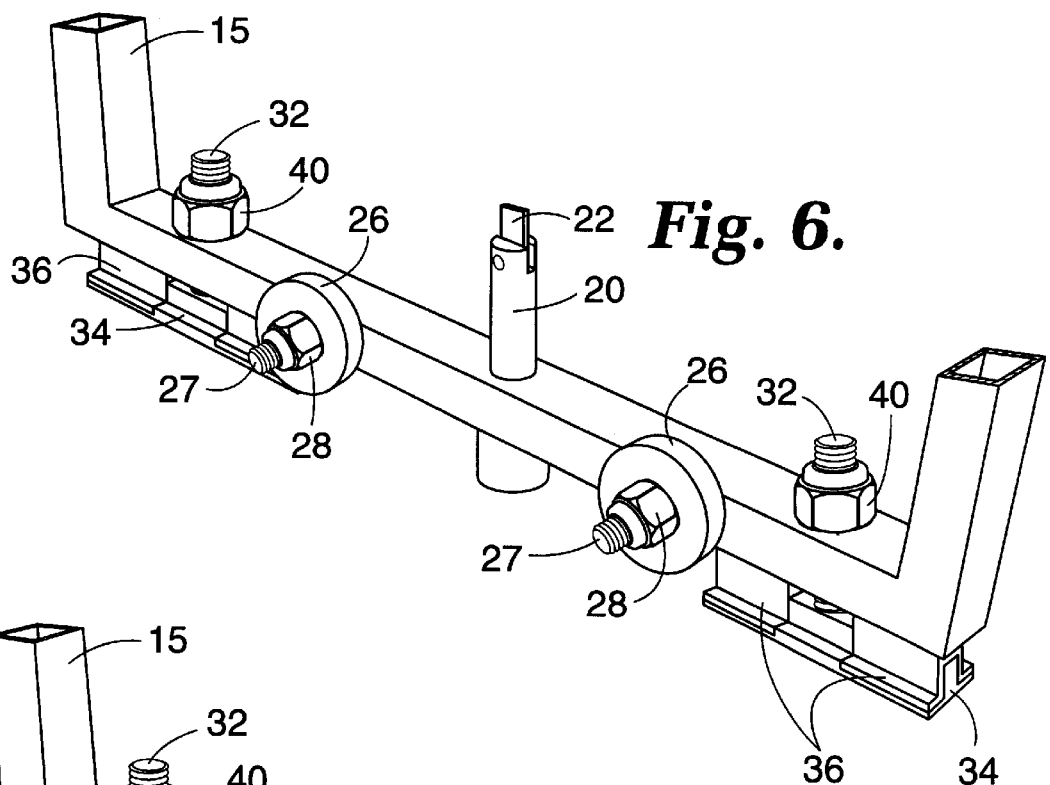
FIG. 6 is a perspective view of an aircraft seat frame having affixed thereto two anchor fittings according to the invention.
Figure 7:
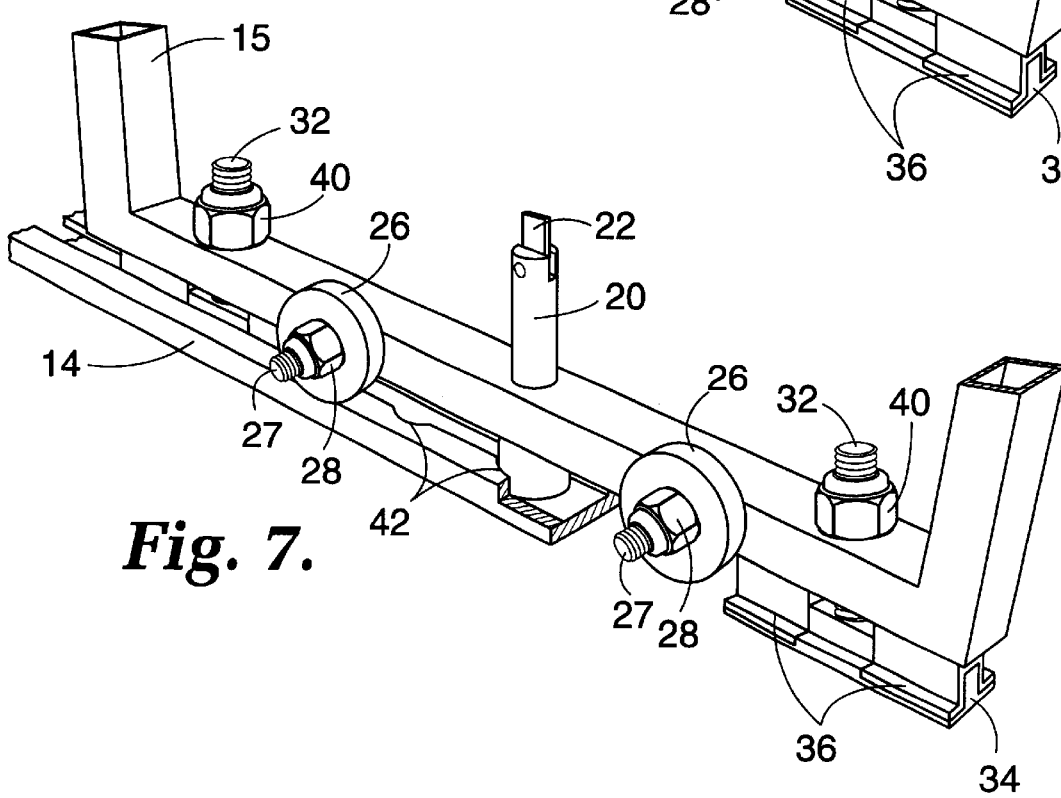
FIG. 7 is a perspective view of the aircraft seat frame of FIG. 6, having fittings attached, being slidably engaged into the mounting track of an aircraft, shown partially broken away.

FIGS. 6 and 7 depict, in exploded perspective views, a frame 15 of chair 12, which frames have wheels 26 affixed to the frames 15 by means of threaded wheel axles 27 and are secured thereto by threaded wheel nuts 28. FIG. 7 shows the frame (chair) resting upon a track 14, shown partially broken away to show the locking pin 20 extended into one of the circular openings 42 in track 14, thereby locking the chair 12 and frame 15 thereat, in place. Preferably the wheels 26 are made of aluminum. Tracks 14 are preferably aluminum alloy 2014, heat treated to condition T6511, and studs 32 are preferably alloy steel 4130, heat-treated to 150,000 psi, T. S., to provide the requisite strength for such applications.

In FIG. 6, the fittings 30 of the invention are shown affixed to seat frame 15, positioned outside track 14. In FIG. 7, the frame with attached fitting is shown being inserted into the slot of track 14. The process of insertion and withdrawal, and movement within track 14, are all clearly evident.

While the invention has been disclosed herein in connection with certain embodiments and detailed descriptions, it will be clear to one skilled in the art that modification or variations of such details can be made without deviating from the gist of this invention, and such modifications or variations are considered to be within the scope of the claims hereinbelow.

What is claimed is:

1. A composite fitting for anchoring an aircraft seat to and within a slotted track mounted to the floor of the aircraft, the fitting comprising:

an elongate base, generally rectangular in both longitudinal and transverse dimensions, and having symmetric, flange-like extensions extending outwardly from said base transversely on both sides thereof and at either end thereof and running longitudinally along said base, said base having symmetric bearings, one each affixed to said base at either end thereof, each bearing extending transversely over said base and base extensions and sized so as to enable said base and base extensions with affixed bearings to be slidably insertable into the slot of said track, said fitting having, additionally, mounting means for removably affixing said fitting to said aircraft seat such that, when the seat is mounted and affixed to said track by said fitting, the surfaces of said symmetric bearings contact the upper inside surfaces of the slot within said track, providing relative ease of slidable movement thereof when required.

2. The fitting of claim 1 wherein said means for affixing the fitting to the seat includes an internally threaded opening in said elongate base and a threaded cylindrical stud threadably attached to said base and extending through a through-hole in the frame of said seat and being affixed thereat by an anchoring nut.

3. The composite fitting of claim 1 wherein said base is constructed of steel.

4. The composite fitting of claim 1 wherein said bearing is constructed of a plastic.

5. A composite fitting for anchoring an aircraft seat to and within a slotted track mounted to the floor of the aircraft, the fitting comprising:

an elongate base, generally rectangular in both longitudinal and transverse dimensions, and having symmetric, flange-like extensions extending outwardly from said base transversely on both sides thereof and at either end thereof and running longitudinally along said base, said base having symmetric bearings, one each affixed to said base at either end thereof, each bearing extending transversely over said base and base extensions and sized so as to enable said base and base extensions with affixed bearings to be slidably insertable into the slot of said track, said fitting having, additionally, mounting means for removably affixing said fitting to said aircraft seat such that, when the seat is mounted and affixed to said track by said fitting, the surfaces of said symmetric bearings contact the upper inside surfaces of the slot within said track, providing relative ease of slidable movement thereof when required, wherein the bearing material is a material selected from the class consisting of ultra high molecular weight polyethylene, nylon, polytetrafluoroethylene and acetal.

6. A composite fitting for anchoring an aircraft seat to and within a slotted track mounted to the floor of the aircraft, the fitting comprising:

an elongate base, generally rectangular in both longitudinal and transverse dimensions, and having symmetric, flange-like extensions extending outwardly from said base transversely on both sides thereof and at either end thereof and running longitudinally along said base, said base having symmetric bearings, one each affixed to said base at either end thereof, each bearing extending transversely over said base and base extensions and sized so as to enable said base and base extensions with affixed bearings to be slidably insertable into the slot of said track, said fitting having, additionally, mounting means for removably affixing said fitting to said aircraft seat such that, when the seat is mounted and affixed to said track by said fitting, the surfaces of said symmetric bearings contact the upper inside surfaces of the slot within said track, providing relative ease of slidable movement thereof when required, wherein said base is steel and said bearing is ultra high molecular weight polyethylene.

7. The fitting of claim 1 adapted for use as seat anchors for the Aerostar PA 60 aircraft.

* * * * *